No. 671,688. Patented Apr. 9, 1901.
F. E. CLARK & H. C. BARKER.
HORSE HOLDING ATTACHMENT FOR VEHICLES.
(Application filed Sept. 6, 1900.)
(No Model.)
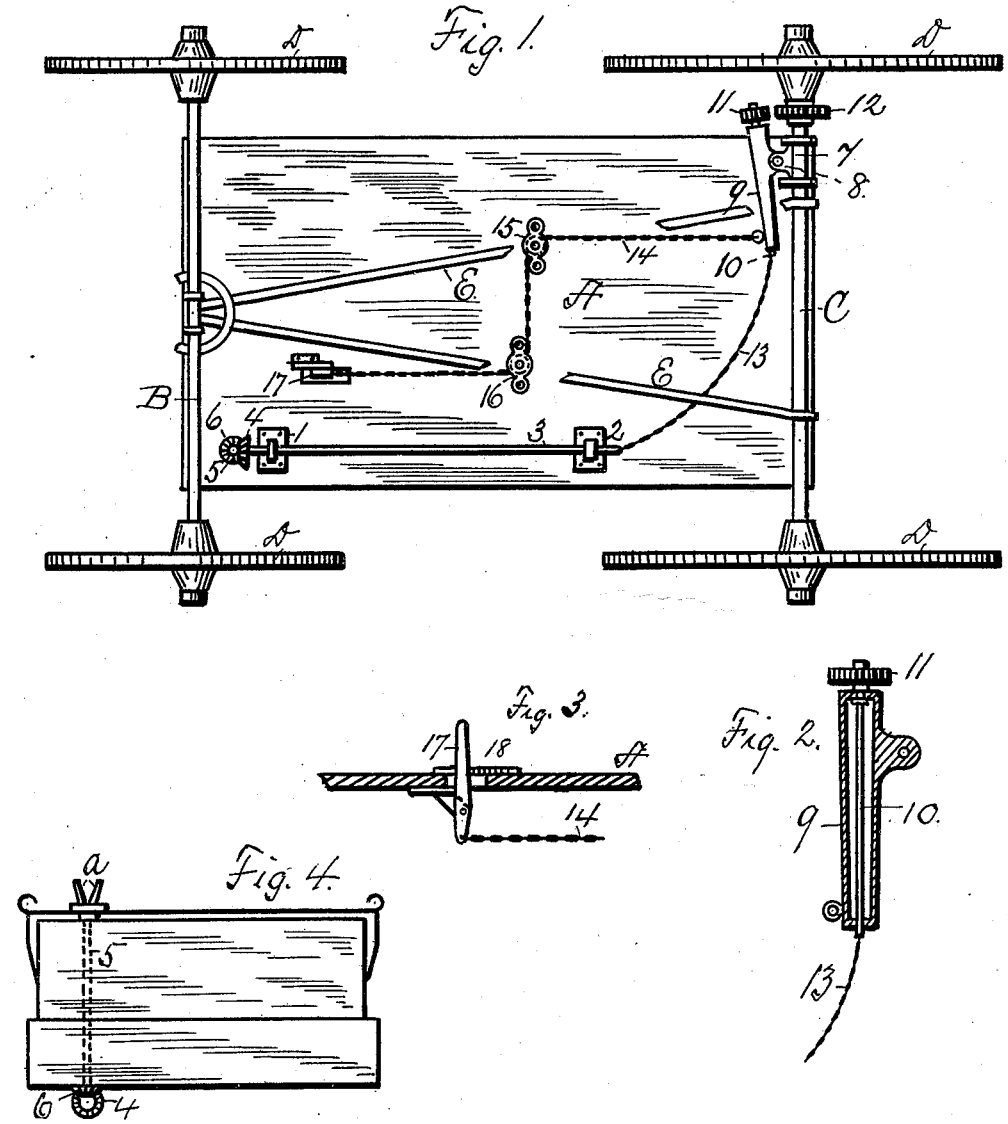
WITNESSES—
A. G. Heymann.
Wallace Murdoch.
INVENTORS.
Frank E. Clark.
H. C. Barker.
by A. L. Bailey
Attorney
THE NORRIS PETERS CO., PHOTO-LITHO., WASHINGTON, D. C.

UNITED STATES PATENT OFFICE.

FRANK ELMER CLARK AND HENRY CLAY BARKER, OF INDEPENDENCE, KANSAS.

HORSE-HOLDING ATTACHMENT FOR VEHICLES.

SPECIFICATION forming part of Letters Patent No. 671,688, dated April 9, 1901.

Application filed September 6, 1900. Serial No. 29,128. (No model.)

*To all whom it may concern:*

Be it known that we, FRANK ELMER CLARK and HENRY CLAY BARKER, citizens of the United States, residing at Independence, in the county of Montgomery and State of Kansas, have invented certain new and useful Improvements in Horse-Holding Attachments for Vehicles; and we do hereby declare the following to be a full, clear, and exact description of the invention, such as will enable others skilled in the art to which it appertains to make and use the same.

Our invention has relation to improvements in horse-holding attachments for vehicles; and the object is to construct a device or mechanism of the kind named and for the purpose intended which is simple and durable in construction and certain and reliable in operation.

The invention consists in the novel construction and combination of parts, as will be hereinafter fully specified, and particularly pointed out in the claims.

The device is fully and clearly illustrated in the accompanying drawings, wherein—

Figure 1 is a bottom plan view of the complete mechanism as attached to a vehicle. Fig. 2 is a detail view of the hollow lever in central longitudinal section, showing the shaft with pinion which engages the teeth on the hub of one of the hind wheels of the vehicle. Fig. 3 is a detail view, partly in section, of the foot-lever for throwing the pinion of the shaft in the hollow lever into and out of engagement. Fig. 4 is a front view of the body of the vehicle, showing the line-rod with line-holder on its upper end and pinion on its lower end to engage the pinion on end of operating rod or shaft.

Referring to the drawings, A designates the bottom or floor of the body of the vehicle. This may be of any of the usual constructions, whether in light or heavy vehicles.

B designates the front axle, C the hind axle, and D the wheels.

E designates the coupling-bars of the vehicle, which are shown broken away, so that certain parts of the mechanism may be fully shown.

To the bottom of the vehicle are secured brackets or hangers 1 2, formed with bearings, as shown, wherein is journaled a shaft 3, carrying on its front end a bevel-pinion 4. This shaft 3 is of such length as may be required, its front end stopping at a point well to the front of the vehicle-body and adjacent to the dasher or board of the body. At the front end of the body is a vertical rod or shaft 5, held in any suitable bearings against vertical displacement, and carrying on its lower end a bevel-pinion 6, placed in mesh with the bevel-pinion 4 on the end of the shaft 3, as indicated in Figs. 1 and 4 of the drawings. On the upper end of the vertical shaft 5 is secured a bifurcated cup or fork *a*, adapted to take in the lines of the harness or to receive and hold the grip-buttons of the lines. The line-holder *a* is mounted on the shaft 5 so that it is held by any suitable pawl-and-ratchet connection to turn with the shaft during the forward movement of the vehicle, but loose on the shaft should the vehicle be backed, so that if the horse should back, the lines will not be wound up in the direction opposite to that intended.

To the hind axle of the vehicle, adjacent to one end thereof, is secured a clip 7, formed with inwardly-extending bearing ears or extensions 8, between which is fulcrumed a hollow sleeve 9, constituting a lever, whereby the engagement between a pinion and the hub may be effected, as hereinafter stated. In the sleeve 9 is journaled a shaft 10, the ends of which extend beyond the ends of the sleeve, as indicated in Fig. 2 of the drawings, and on the projecting end of the shaft 10, adjacent to the hub of the vehicle, is mounted a pinion 11, which is adapted to engage with an annular gear 12 on the inner end of the hub. To the rear or inner end of the shaft 10 is secured one end of a chain or cable 13, the other end of which is connected to the inner end of the shaft 3, as indicated in the drawings in Fig. 1. The chain or cable 13 is held from sagging too much by being supported on the coupling-bars of the vehicle, as indicated in the drawings.

It will be perceived from the foregoing description, taken in connection with the drawings, that when the pinion 11 is in engagement with the annular gear 12 on the hub and the wheel is rotated the respective shafts will all be rotated, and if the lines are in place in the bifurcated cup on the upper end of the vertical shaft 5 they will be speedily wound up on the cup, and the tension thus created on the lines will restrain the horse from forward movement.

To operate the lever or sleeve 9 so as to throw the pinion 11 into and out of engagement with the annular gear 12, a chain or cable 14 is connected to the inner end of the sleeve 9 and from thence carried forward over a pulley or sheave 15, secured to the bottom of the vehicle, and then, so that the power may be applied at a convenient and selected point, the chain is carried at substantially right angles and over a second pulley or sheave 16, and from thence carried to and secured to the lower end of a foot-lever 17, fulcrumed in the bottom of the vehicle-body, as shown in Fig. 3 of the drawings. The opening in the bottom of the body of the vehicle is elongated to provide space for the movements of the foot-lever, and in order that the foot-lever may be held in any desired position to which moved a rack or notched bar or plate 18 is secured along the edge of the slot in which the edge of the foot-lever engages, or a plate or projection (not shown) may be secured vertically to the face of the foot-lever to engage the rack in the usual manner. It will be noticed from the foregoing that if the foot-lever is moved in the proper direction the sleeve-lever will be moved to throw the pinion 11 into engagement with the annular gear on the hub, and then the rotation of the vertical shaft at the front end of the vehicle ensues.

The device after being thrown into engagement operates automatically on the progressive or forward movement of the vehicle. It may be attached to any kind of road-vehicle and only works at the will of the person in control of it. The backward movement of the vehicle will not tighten the lines, because the clutch engagement of the line-holder permits the reversal of the forward direction of the vehicle, and the yielding tension of the connecting-chain on the shafts permits any ordinary motion of the body of the vehicle.

What we claim, and desire to secure by Letters Patent, is—

1. In a horse-holding attachment for vehicles, the combination with a hind wheel of the vehicle provided with an annular gear on the inner end of the hub thereof, of a sleeve fulcrumed to the hind axle, a shaft journaled in the sleeve, a pinion on the outer end of the shaft to engage the annular gear on the hub, a shaft as 3 journaled on the vehicle and flexibly connected to the end of the shaft in the fulcrumed sleeve, a pinion on the front end of the shaft 3, a vertical shaft journaled at the front end of the vehicle, a pinion on the lower end of the vertical shaft in mesh with the pinion on the front end of the shaft 3, and means substantially as described, to move the fulcrumed sleeve and throw the pinion on the shaft therein into and out of engagement with the annular gear on the hub.

2. In a horse-holding attachment for vehicles, the combination with a hind wheel of the vehicle provided with an annular gear on the inner end of the hub, of a sleeve fulcrumed to the hind axle, a shaft journaled in the sleeve, a pinion on the outer end of the shaft to engage the annular gear on the hub, a shaft, as 3, journaled on the vehicle, a chain connecting the inner end of the shaft 3 and the inner end of the shaft in the sleeve, a pinion on the front end of the shaft 3, a vertical shaft journaled at the front end of the vehicle, a pinion on the lower end of the vertical shaft to mesh with the pinion on the front end of the shaft 3, sheaves on the body of the vehicle, a chain connected to the fulcrumed sleeve and arranged over said sheaves, and a lever having connection to said latter-named chain to operate the sleeve and throw the pinion of the shaft therein into and out of engagement with the annular gear on the hub.

In testimony whereof we affix our signatures in presence of two witnesses.

FRANK ELMER CLARK.
    HENRY CLAY BARKER.

Witnesses:
 W. P. LYON,
 F. E. COLYER.